(12) United States Patent
Beckhart

(10) Patent No.: US 9,923,351 B2
(45) Date of Patent: Mar. 20, 2018

(54) UNIVERSAL BRACKET AND METHOD

(71) Applicant: Gordon Haggott Beckhart, Colorado Springs, CO (US)

(72) Inventor: Gordon Haggott Beckhart, Colorado Springs, CO (US)

(*) Notice: Subject to any disclaimer, the term of this patent is extended or adjusted under 35 U.S.C. 154(b) by 0 days.

(21) Appl. No.: 14/855,506

(22) Filed: Sep. 16, 2015

(65) Prior Publication Data

US 2017/0077692 A1 Mar. 16, 2017

(51) Int. Cl.
*A47B 97/04* (2006.01)
*H02G 3/30* (2006.01)
*F16M 13/02* (2006.01)

(52) U.S. Cl.
CPC ............ *H02G 3/30* (2013.01); *F16M 13/02* (2013.01)

(58) Field of Classification Search
CPC .................................. H02G 3/30; F16M 13/02
USPC ...... 248/309.1, 346.01, 346.02, 346.03, 499, 248/500, 505, 918; 108/53.1, 53.3; 188/377; 211/87.01
See application file for complete search history.

(56) References Cited

U.S. PATENT DOCUMENTS

| | | | | |
|---|---|---|---|---|
| 1,500,870 A * | 7/1924 | Holdredge | ............... | E02D 27/02 40/124.5 |
| 4,735,154 A * | 4/1988 | Hemery | ............. | B65D 19/0012 108/56.1 |
| 5,191,843 A * | 3/1993 | Ausavich | ........... | B65D 19/0026 108/56.1 |
| 5,630,303 A * | 5/1997 | Devenish, III | ......... | E02D 27/32 248/346.01 |
| 7,625,023 B2 * | 12/2009 | Audi | ........................ | A62B 1/22 293/134 |
| 8,714,307 B2 * | 5/2014 | Burnett | .................... | B25H 1/04 182/151 |
| 2004/0134390 A1 * | 7/2004 | Apps | .................. | B65D 19/0018 108/53.1 |
| 2005/0040308 A1 * | 2/2005 | Sweeney | ................. | F24F 13/32 248/346.02 |
| 2008/0060561 A1 * | 3/2008 | Carrasco | ............ | B65D 19/0061 108/51.11 |
| 2014/0360120 A1 * | 12/2014 | Brisendine | ........ | E04F 15/02405 52/582.1 |

OTHER PUBLICATIONS

U.S. Appl. No. 90/095,848, filed Aug. 2015, Carrel.*

* cited by examiner

*Primary Examiner* — Gwendolyn Baxter

(57) ABSTRACT

A universal bracket for electronic device, electrical devices, and their cabling is made up of one or more interconnected bracket plates. Each bracket plate has a rectangular base having a first side and a second side. A number of standoff platforms are attached to the second side. The standoff platforms have a polygonal cross section with a number of sides. A hole extends through one of the sides. A number of screw holes are in the rectangular base. The universal bracket can be screwed or otherwise affixed to a mounting surface. A zip tie or other tie is used to hold electronic and electrical devices and associated wires semi-permanently to the universal bracket.

16 Claims, 5 Drawing Sheets

UNIVERSAL BRACKET AND METHOD

RELATED APPLICATIONS

Statement Regarding Federally Sponsored Research

Not applicable

THE NAMES OF THE PARTIES TO A JOINT RESEARCH AGREEMENT

Not applicable

REFERENCE TO A SEQUENCE LISTING, A TABLE, OR A COMPUTER PROGRAM LISTING

Not applicable

BACKGROUND OF THE INVENTION

The explosion of electronic devices in our lives often results in our desks, televisions, and closets being full of electronic boxes and a tangle of wires. One solution was the television armoire, however these were large pieces of furniture that do not fit well. Another solution has been specialized brackets. For instance, a number of specialized brackets have been made to hold various devices such as routers or apple TVs. These brackets only worked for specific devices and did little to solve the problem of the tangle of wires associated with these devices.

A similar problem has existed with standard electrical devices for years, for instance, water sprinkling system controllers and electrical panels. One solution was been to use peg boards. However, pegboard material does not age well and peg boards hangers are not well suited to holding electronic devices semi-permanently nor do they provide airflow to allow the electronics devices to cool. Ties and connectors are very hard to weave through a pegboard.

Thus there exists a need for a universal bracket that works with a variety of electronic and electrical devices, provides for airflow, and holds devices and wires out of the way in a semi-permanent manner.

BRIEF SUMMARY OF INVENTION

A universal bracket that overcomes these and other problems has a rectangular base having a first side and a second side. A number of standoff platforms are attached to the second side. The standoff platforms have a polygonal cross section with a number of sides. A hole extends through one of the sides. A number of screw holes are in the rectangular base. In one embodiment a number of the rectangular bases can be connected together to create a universal bracket having the size and shape needed.

The standoff platforms provide airflow for the electronic devices and make it easy to weave zip ties through or other connectors. The electronic devices are attached to the universal bracket with zip ties or similar devices and can be easily placed wherever on the bracket desired by the user. The wires can be held out of the way using a zip tie or similar device. The universal bracket can be attached to a mounting surface such as a wall, shelf, desk, rack or even the backside of a television using screws or adhesive, such as double sided tape.

DETAILED DESCRIPTION OF THE INVENTION

The present invention is directed to a universal bracket for electronic devices, electrical devices, and their cabling. The universal bracket has a rectangular base having a first side and a second side. A number of standoff platforms are attached to the second side. The standoff platforms have a polygonal cross section with a number of sides. A hole extends through one of the sides. A number of screw holes are in the rectangular base. In one embodiment a number of the rectangular bases can be connected together to create a universal bracket having the size and shape needed.

The standoff platforms provide airflow for the electronic devices and make it easy to weave connectors through. The electronic devices are attached to the universal bracket with zip ties or similar devices and can be easily placed wherever on the bracket desired by the user. The wires can be held out of the way using a zip tie or similar device. The universal bracket can be attached to a mounting surface such as a wall, shelf, desk, rack or even the backside of a television using screws or adhesive, such as double sided tape.

Figure 1:
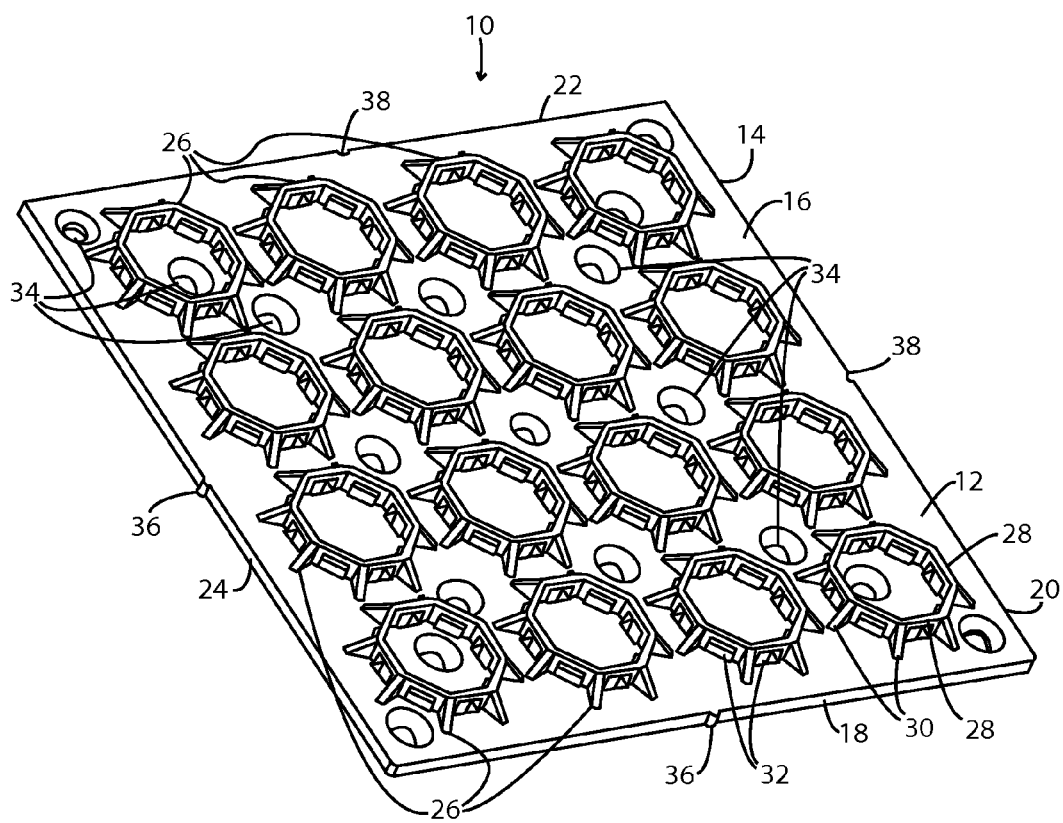
FIG. 1 is a top left perspective view of a universal bracket in accordance with one embodiment of the invention.

FIG. 1 is a top left perspective view of a universal bracket 10 in accordance with one embodiment of the invention. The universal bracket 10 has a rectangular base 12 with a first side 14, a second side 16, and four edges 18, 20, 22, 24. A plurality of standoff brackets 26 are formed on the second side 16 of the rectangular base 12. The plurality of standoff brackets 26 have a polygonal cross section with a plurality of walls 28 and braces 30 between the standoff walls 28 (see lower right corner of drawing). Each of the standoff walls 28 have a hole 32. The bracket plate 10 has a number of through holes that are designed to hold the bracket plate 10 to a mounting platform, such as a wall, or desk, or television with screws or similar devices. The bracket plate 10 can also be adhered to the mounting platform. The bracket plate 10 has a pair of male connectors 36 on two of its four edges 18, 20 and a pair of female connectors 38 on the other two of its four edges 22, 24. This allows multiple of the bracket plates 10 to be connected together to multiple different sizes and shapes of the universal bracket to meet a variety of different needs.

Figure 2:
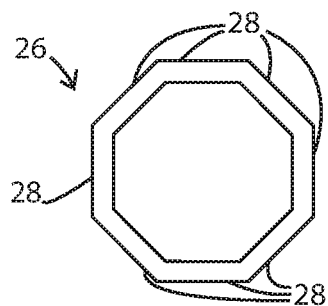
FIG. 2 is a top view of a standoff platform in accordance with one embodiment of the invention.

FIG. 2 is a top view of a standoff platform 26 in accordance with one embodiment of the invention. This standoff platform 26 is octagonal with all eight walls 28 touching each other. Other polygonal shapes may be used and while a polygonal shape is preferred it is not necessary. For instance the platform could be round or oval. The standoff walls 28 could be placed on the surface and not touch each other or they can be placed linearly or in a criss-cross pattern.

Figure 3:
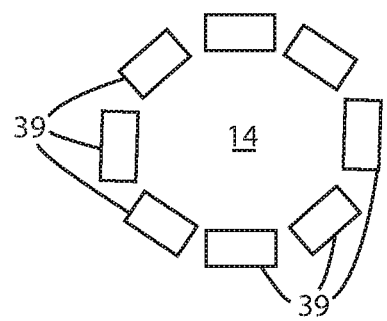
FIG. 3 is a bottom view of a bracket plate associated with a standoff platform in accordance with one embodiment of the invention.

FIG. 3 is a bottom view of a second of a bracket plate 10 associated with the standoff platform in accordance with one embodiment of the invention. The first side 14 of the rectangular base 12 is generally flat, however as this view shows a number of through holes 39 are formed below the walls 28 of the standoff bracket 26. These holes 39 allow for ties, such as zip ties to extend through the holes to hold electronic components or wires. In addition, they allow for additional air circulation to keep the electronic devices cool. In one embodiment the bracket plate 10 is made of an insulating material such as plastic. This decreases the chances of accidental groundings, shorts, and allows for good transmission of RF (radio frequency signals).

Figure 4:
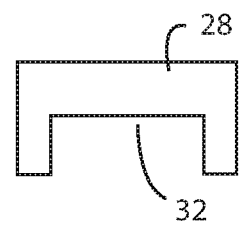
FIG. 4 is a side view of a wall of a standoff platform in accordance with one embodiment of the invention.

FIG. 4 is a side view of a wall 28 of a standoff platform 26 in accordance with one embodiment of the invention. In the standoff wall 28 is a hole 32. This hole 32 allows for ties to extend through and allows for airflow.

Figure 5:
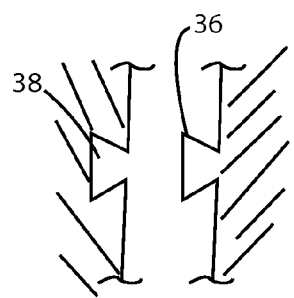
FIG. 5 is a cutout view of mating connectors for bracket plates of a universal bracket in accordance with one embodiment of the invention.

FIG. 5 is a cutout view of mating connectors 36, 38 for bracket plates 10 of a universal bracket in accordance with one embodiment of the invention. The male connector 36 has a wedge shape that engages the female connector 38 having a wedge shaped notch to form a secure connection. Other shapes of connectors or other connectors could also be used without departing from the invention.

Figure 6:
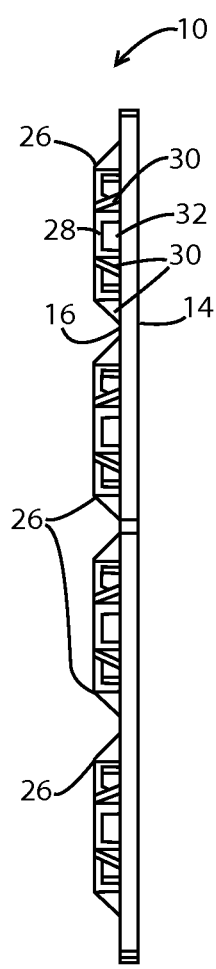
FIG. 6 is a side view of a universal bracket in accordance with one embodiment of the invention.

FIG. 6 is a side view of a universal bracket 10 in accordance with one embodiment of the invention. The bracket 10 has a first side 14 and a second side 16. The standoff platforms 26 can be seen attached to the second side 16. The holes 32 in the walls 28 can be clearly seen.

Figure 7:
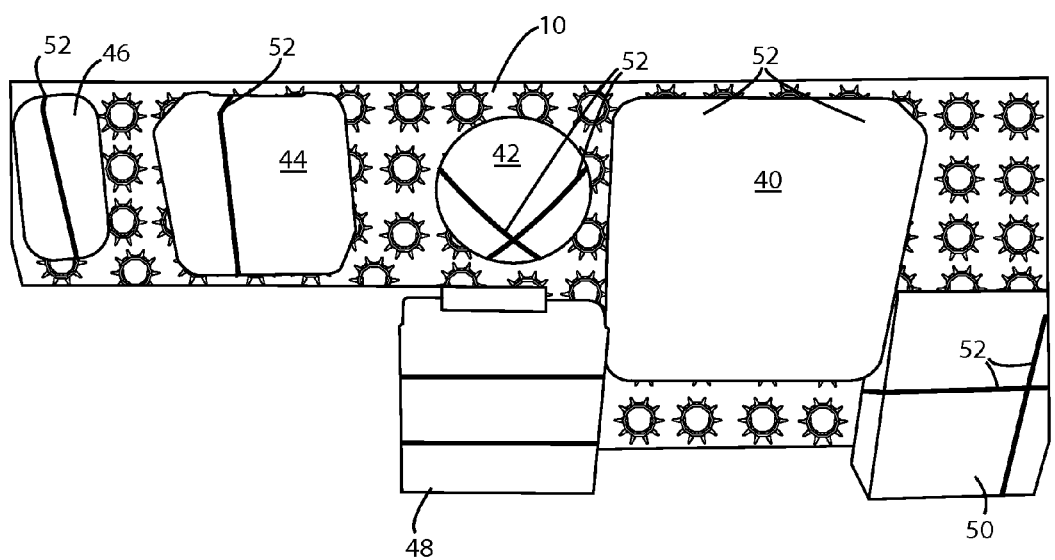
FIG. 7 is a top left perspective view of a universal bracket with a plurality of electronic devices attached in accordance with one embodiment of the invention.

FIG. 7 is a top left perspective view of a universal bracket 10 with a plurality of electronic devices 40, 42, 44, 46, 48, 50 attached in accordance with one embodiment of the invention. This figure shows that the universal bracket 10 can be made up of a number of bracket plates 12. In this case a number of bracket plates have been connected together to form an L shape. The electronic devices 40, 42, 44, 46, 48, 50 are held to the universal bracket 10 using zip ties 52 looped through the holes associated with the standoff platforms. Zip ties or other ties or clips may also be used to organize and gather the wires to the universal bracket.

Figure 8:
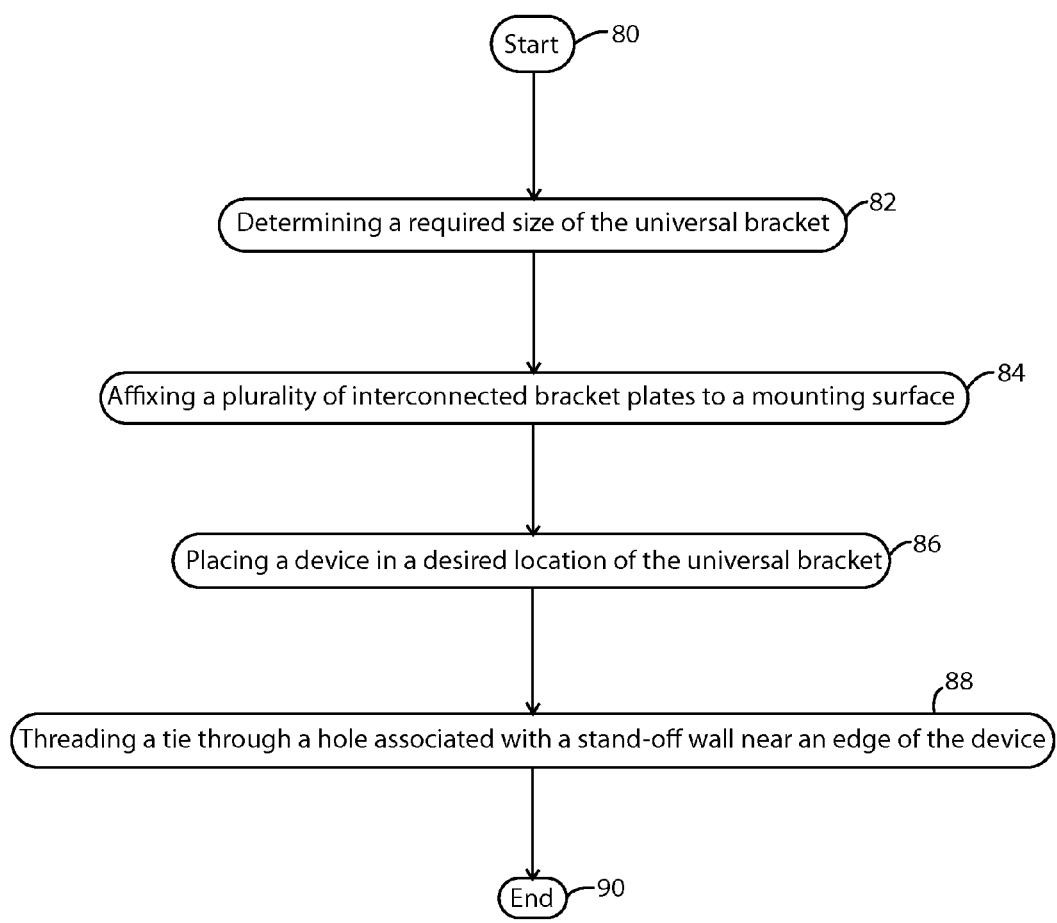
FIG. 8 is a flow chart of the steps used in method of operating a universal bracket in accordance with one embodiment of the invention.

FIG. 8 is a flow chart of the steps used in method of operating a universal bracket in accordance with one embodiment of the invention. The process starts, step 80, by determining the required size and shape of the universal bracket at step 82. The plurality of interconnected bracket plates forming the universal bracket are affixed to a mounting surface at step 84. A device is placed in a desired location on the universal bracket at step 86. At step 88, a tie is threaded through a hole associated with the standoff wall near the edge of the device, which ends the process at step 90.

Thus there has been described a universal bracket that works with a variety of electronic and electrical devices, provides for airflow, and holds devices and wires out of the way in a semi-permanent manner.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A universal bracket for holding electrical and electronic devices, comprising:
   a rectangular base having a first side and a second side;
   a plurality of standoff platforms attached to the second side, wherein the plurality of standoff platforms have a polygonal cross section with a number of sides, a hole extending through one of the number of sides, further including a plurality of ties that fit through the hole in the standoff platforms; and
   a screw hole in the rectangular base.

2. The universal bracket of claim 1, further including a plurality of through tie holes beneath the number of sides of the plurality of standoff platforms.

3. The universal bracket of claim 1 wherein the rectangular base has four edges, and two of the four edges have a male connector.

4. The universal bracket of claim 3, wherein two of the edges have a female connector.

5. The universal bracket of claim 4, further including a second rectangular base connected to the rectangular base.

6. The universal bracket of claim 1, wherein the rectangular base is formed of a nonconductive material.

7. A universal bracket for mounting devices, compromising:
   a plurality of bracket plates, each of the plurality of bracket plates comprising;
   a base having a first side and a second side;
   a plurality of standoff walls extending from the second side of the base; and
   a wall hole extending through at least some of the plurality of standoff walls further including a tie that extends through the wall hole.

8. The universal bracket of claim 7, wherein the base has a plurality of through holes.

9. The universal bracket of claim 8, wherein a first set of the plurality of through holes are counter sunk.

10. The universal bracket of claim 8, wherein a set of the plurality of through holes in the base are aligned with the plurality of standoff walls.

11. The universal bracket of claim 7, wherein the base has four edges, and at least one of the four edges has a male connector.

12. The universal bracket of claim 11, wherein at least one of the four edges has a female connector.

13. A method of operating a universal bracket comprising the steps of:
   determining a required size of the universal bracket;
   affixing a plurality of interconnected bracket plates to a mounting surface;
   placing a device in a desired location of the universal bracket;
   threading a tie through a hole associated with a standoff wall near an edge of the device.

14. The method of claim 13, further including the step of securing a second tie around the device.

15. The method of claim 13, wherein the step affixing includes the steps of:
   placing a first bracket plate in a desired location on the mounting surface;
   screwing the first bracket plate to the mounting surface.

16. The method of claim 15, further including the steps of:
   mating an edge of a second bracket plate to an edge of the second mounting plate;
   screwing the second bracket plate to the mounting surface.

* * * * *